(12) United States Patent
Kobayashi

(10) Patent No.: US 11,843,893 B2
(45) Date of Patent: Dec. 12, 2023

(54) PHOTOELECTRIC CONVERSION DEVICE, ELECTRONIC DEVICE, AND SUBSTRATE

(71) Applicant: CANON KABUSHIKI KAISHA, Tokyo (JP)

(72) Inventor: Hideo Kobayashi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/588,484

(22) Filed: Jan. 31, 2022

(65) Prior Publication Data

US 2022/0247964 A1 Aug. 4, 2022

(30) Foreign Application Priority Data

Feb. 4, 2021 (JP) ................................. 2021-016892

(51) Int. Cl.
  *H04N 25/772* (2023.01)
  *H04N 25/616* (2023.01)

(52) U.S. Cl.
  CPC ......... *H04N 25/772* (2023.01); *H04N 25/616* (2023.01)

(58) Field of Classification Search
  CPC .... H04N 25/772; H04N 25/616; H04N 25/75; H04N 25/79
  USPC ...................................................... 348/241
  See application file for complete search history.

(56) References Cited

U.S. PATENT DOCUMENTS

| 7,990,440 B2 | 8/2011 | Kobayashi et al. |
| 8,710,558 B2 | 4/2014 | Inoue et al. |
| 8,835,828 B2 | 9/2014 | Kobayashi |
| 9,264,641 B2 | 2/2016 | Kobayashi |
| 9,357,122 B2 | 5/2016 | Kususaki et al. |
| 9,407,847 B2 | 8/2016 | Maehashi et al. |
| 9,438,828 B2 | 9/2016 | Itano et al. |
| 9,509,931 B2 | 11/2016 | Kobayashi et al. |
| 9,602,752 B2 | 3/2017 | Kobayashi et al. |
| 10,015,430 B2 | 7/2018 | Kobayashi et al. |

(Continued)

FOREIGN PATENT DOCUMENTS

WO 2019/069614 A1 4/2019

OTHER PUBLICATIONS

U.S. Appl. No. 17/690,229, filed Mar. 9, 2022 (First Named Inventor: Hideo Kobayashi).

(Continued)

*Primary Examiner* — Lin Ye
*Assistant Examiner* — Chan T Nguyen
(74) *Attorney, Agent, or Firm* — Venable LLP

(57) ABSTRACT

A photoelectric conversion device comprising a pixel portion in which pixels each including a photoelectric converter are arranged, a sample/hold unit configured to sample a signal generated in the photoelectric converter via a vertical signal line and hold the signal, and a converter configured to perform an analog/digital conversion is provided. In the sample/hold unit, a first sample/hold circuit that samples a signal for when the photoelectric converter is reset and a second sample/hold circuit that samples a signal for when a photoelectric conversion operation is performed are connected to one vertical signal line. The pixel portion is arranged on a first substrate, a part of a group configured by the sample/hold unit and the converter is arranged on a second substrate, and another part of the group is arranged on a third substrate.

19 Claims, 13 Drawing Sheets

(56) References Cited

U.S. PATENT DOCUMENTS

| | | |
|---|---|---|
| 10,609,316 B2 | 3/2020 | Kobayashi |
| 11,268,851 B2 | 3/2022 | Kobayashi et al. |
| 2005/0040318 A1* | 2/2005 | Ooshima ........... H01L 27/14643 |
| | | 348/E3.029 |
| 2012/0175503 A1 | 7/2012 | Kuroda et al. |
| 2014/0139713 A1* | 5/2014 | Gomi .................. H04N 25/709 |
| | | 348/308 |
| 2016/0227141 A1 | 8/2016 | Kobayashi et al. |
| 2020/0265909 A1* | 8/2020 | Matsuura ............... H04N 25/75 |
| 2021/0021770 A1 | 1/2021 | Nakazawa et al. |
| 2021/0021777 A1 | 1/2021 | Kobayashi et al. |
| 2021/0021782 A1 | 1/2021 | Sato et al. |
| 2021/0360180 A1 | 11/2021 | Saito et al. |
| 2021/0391365 A1 | 12/2021 | Kobayashi et al. |
| 2022/0030164 A1 | 1/2022 | Kobayashi |

OTHER PUBLICATIONS

U.S. Appl. No. 17/690,236, filed Mar. 9, 2022 (First Named Inventor: Hideo Kobayashi).
U.S. Appl. No. 17/690,255, filed Mar. 9, 2022 (First Named Inventor: Hideo Kobayashi).
U.S. Appl. No. 17/693,521, filed Mar. 14, 2022 (First Named Inventor: Hideo Kobayashi).
U.S. Appl. No. 17/704,046, filed Mar. 25, 2022 (First Named Inventor: Hideo Kobayashi).

* cited by examiner

PHOTOELECTRIC CONVERSION DEVICE, ELECTRONIC DEVICE, AND SUBSTRATE

BACKGROUND OF THE INVENTION

Field of the Invention

The present invention relates to a photoelectric conversion device, an electronic device and a substrate.

Description of the Related Art

International Patent Application Publication No. 2019/069614 describes an individual imaging device having, with respect to one vertical signal line, a sample-and-hold unit having two sample-and-hold circuits in parallel and an analog-to-digital unit for converting a pixel signal outputted from the sample-and-hold unit to a digital signal.

SUMMARY OF THE INVENTION

The configuration described in International Patent Application Publication No. 2019/069614 may be of greater circuit size because many circuits are connected to a single vertical signal line. Further, it is difficult to reduce the capacity of the sample-and-hold circuit considering the noise resistance of the pixel signal in order to improve the image quality. Furthermore, when increasing the number of vertical signal lines in order to increase the reading speed of the pixel signal in accordance with an increase in pixels or the like, the number of sample-and-hold units and the analog-to-digital units is increased in accordance with the increase in vertical signal lines, which further increases the circuit scale. As the circuit scale increases, there may be more constraints on the arrangement and configuration of these circuits formed on the substrate.

Some embodiments of the present invention provide techniques advantageous for increased circuit size in photoelectric conversion devices.

According to some embodiments, a photoelectric conversion device comprising: a pixel portion in which a plurality of pixels, each including a photoelectric conversion element, are arranged in a matrix; a sample-and-hold unit configured to sample a signal generated in the photoelectric conversion element via a vertical signal line from the pixel portion and hold the signal; and a conversion unit configured to perform an analog-to-digital conversion on a signal outputted from the sample-and-hold unit, wherein in the sample-and-hold unit, a first sample-and-hold circuit that samples a signal for when the photoelectric conversion element is reset and a second sample-and-hold circuit that samples a signal for when a photoelectric conversion operation is performed in the photoelectric conversion element are connected to one vertical signal line, the pixel portion is arranged on a first substrate, a part of a group configured by the sample-and-hold unit and the conversion unit is arranged on a second substrate, and another part of the group is arranged on a third substrate, is provided.

According to some other embodiments, a substrate comprising: an input unit; an output unit; and a sample-and-hold circuit, wherein the substrate is to be stacked with other plurality of substrates, an analog signal is inputted to the input unit from some substrates of the plurality of substrates, the sample-and-hold circuit is provided with a configuration that holds the analog signal inputted to the input unit, and the output unit outputs an analog signal that the sample-and-hold circuit held to other substrates of the plurality of substrates, is provided.

Further features of the present invention will become apparent from the following description of exemplary embodiments (with reference to the attached drawings).

DESCRIPTION OF THE EMBODIMENTS

Figure 1:
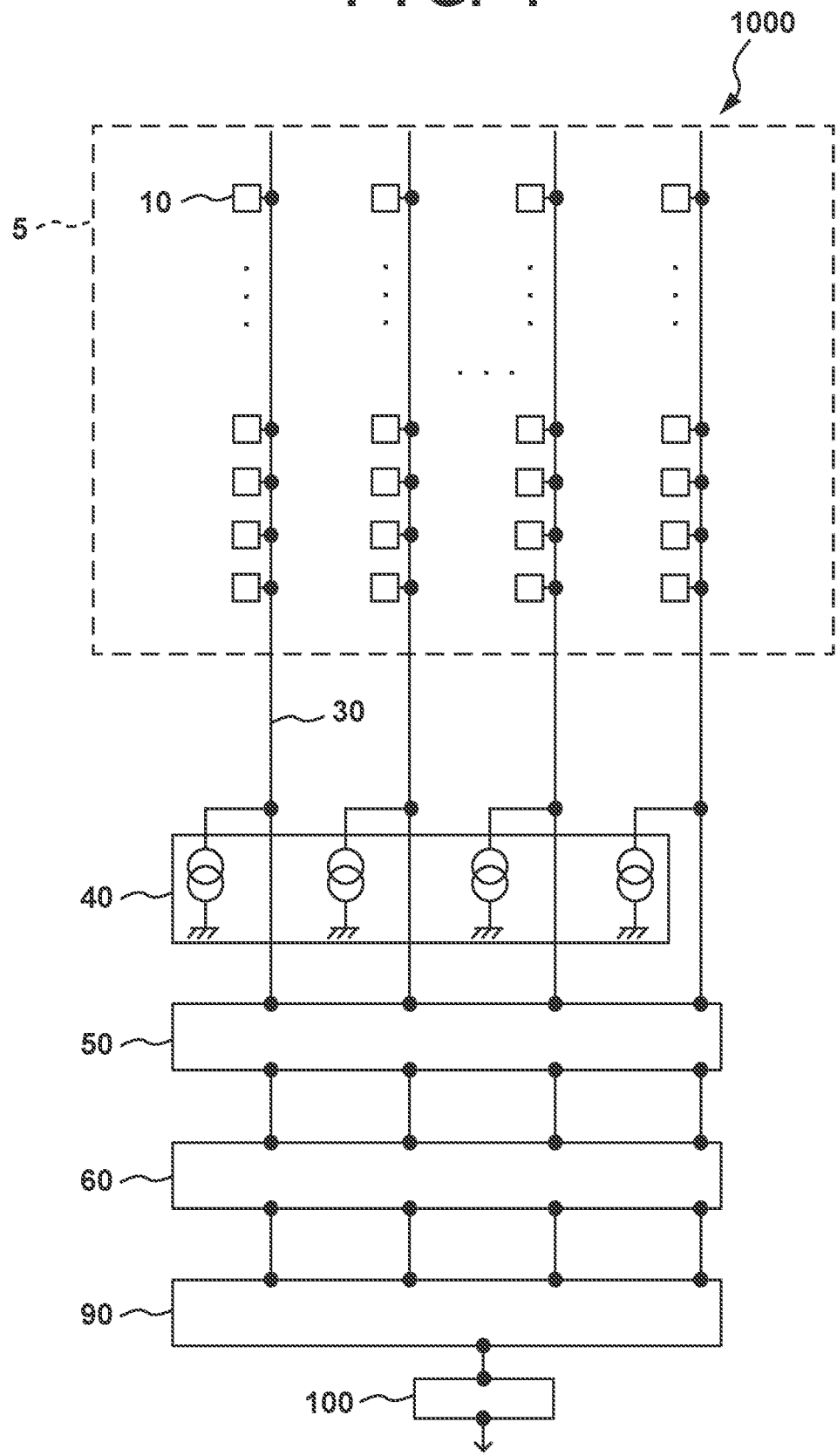
FIG. 1 is a block diagram illustrating a schematic configuration of a photoelectric conversion device according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

A photoelectric conversion device according to an embodiment of the present disclosure will be described with reference to FIGS. 1 to 14. FIG. 1 is a block diagram illustrating an example of a configuration of a photoelectric conversion device 1000 according to the present embodiment. The photoelectric conversion device 1000 includes a pixel portion 5, a current source 40, a sample-and-hold unit 50, a conversion unit 60, a data processing unit 90, and an output unit 100. The photoelectric conversion device 1000 may be a so-called CMOS image sensor.

In the pixel portion 5, a plurality of pixels 10, each including a photoelectric conversion element, are arranged in a matrix. Here, a row direction refers to a left-and-right direction in FIG. 1, and a column direction refers to an up-and-down direction in FIG. 1. A pixel 10 generates a signal charge corresponding to incident light.

In the pixel portion 5, corresponding to the pixel columns in which the pixels 10 are disposed, vertical signal lines 30 are arranged along the column direction. A vertical signal line 30 transfers the signal corresponding to the signal charge generated by the photoelectric conversion element of a pixel 10 from the pixel 10 to the sample-and-hold unit 50.

The current source 40 is disposed corresponding to the respective vertical signal lines 30. The current source 40 provides a bias current via the vertical signal lines 30 to the pixels 10 selected for reading the signal.

The sample-and-hold unit 50 samples and holds the signal generated by the photoelectric conversion element of the respective pixels 10 from the pixel portion 5 via the vertical signal lines 30. In the present embodiment, in the sample-and-hold unit 50, two sample-and-hold circuits are connected to one vertical signal line 30: a sample-and-hold circuit for sampling a signal when resetting the photoelectric conversion element and a sample-and-hold circuit for sampling a signal when the photoelectric conversion operation is performed by the photoelectric conversion element.

The conversion unit 60 performs analog-to-digital conversion on the signal outputted from the sample-and-hold unit 50. In the conversion unit, analog-to-digital conversion circuits are connected corresponding to the respective vertical signal lines. As the analog-to-digital conversion circuits, slope analog-to-digital conversion circuits, successive approximation analog-to-digital conversion circuits, delta-sigma (ΔΣ) analog-to-digital conversion circuits, and the like are used, but limitation is not made to these.

The data processing unit 90 is a digital signal processing unit that processes the digital signal outputted from the conversion unit 60. For example, the digital signal outputted from the conversion unit 60 may be subjected to correction processing, complementation processing, or the like. The output unit 100 outputs the signal processed by the data processing unit 90 from the photoelectric conversion device 1000 to a unit external to the photoelectric conversion device 1000.

Figure 2:
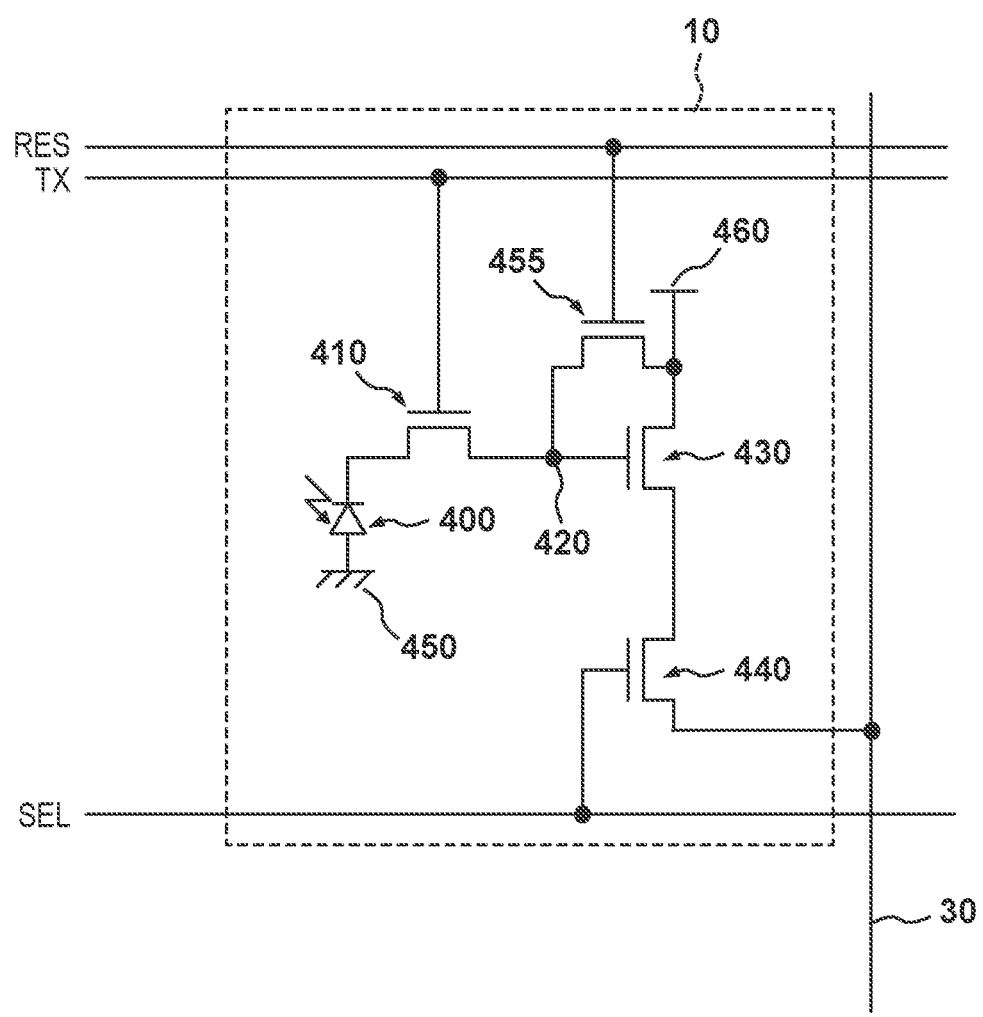
FIG. 2 is a circuit diagram illustrating an example of a configuration of a pixel of the photoelectric conversion device of FIG. 1.

FIG. 2 is a circuit diagram illustrating a configuration example of a pixel 10. A pixel 10 includes a photoelectric conversion element 400, a transfer transistor 410, a reset transistor 455, an amplification transistor 430, and a selection transistor 440. The photoelectric conversion element 400 may be, for example, a photodiode. One of the main electrodes of the photoelectric conversion element 400 is connected to a ground potential 450, and the photoelectric conversion element 400 photoelectrically converts the received light to the signal charge (e.g., photoelectrons) of the amount of charge corresponding to the amount of light thereof and accumulates it. The other of the main electrodes of the photoelectric conversion element 400 is electrically connected to the gate electrode of the amplification transistor 430 via the transfer transistor 410. A node 420 to which the gate electrode of the amplification transistor 430 is electrically connected serves as a floating diffusion. A floating diffusion is a charge-voltage conversion unit for converting the signal charge generated by the photoelectric conversion element 400 into a signal voltage.

A transfer signal TX is supplied to the gate electrode of the transfer transistor 410. By the transfer transistor 410 entering a conductive state in response to the transfer signal TX, the signal charge photoelectrically converted by the photoelectric conversion element 400 and accumulated in the photoelectric conversion element 400 is transferred to the node 420, which is a floating diffusion.

The reset transistor 455 is connected between a power supply potential 460 and the node 420. Here, when a transistor is expressed as being connected between A and B, it indicates that one of the main electrodes of the transistor is connected to A and the other of the main electrodes is connected to B. Also, the gate electrode of the transistor is not connected to A or B.

A reset signal RES is supplied to the gate electrode of the reset transistor 455. By the reset transistor 455 entering a conductive state in response to the reset signal RES, the potential of the node 420 (floating diffusion) is reset to the power supply potential 460, sweeping out the electric charge accumulated in the floating diffusion.

The gate electrode, one of the main electrodes, and the other of the main electrodes of the amplification transistor 430 is connected to the node 420, the power supply potential 460, and the selection transistor 440, respectively. The amplification transistor 430 is an input unit of a source follower for reading the signal obtained by the photoelectric conversion of the photoelectric conversion element 400. That is, the other of the main electrodes of the amplification transistor 430 is connected to the vertical signal line 30 via the selection transistor 440. The above-described current source 40 connected to the amplification transistor 430 and the vertical signal line 30 constitutes a source follower for converting the voltage of the node 420 to the potential of the vertical signal line 30.

The selection transistor 440 is connected between the amplification transistor 430 and the vertical signal line 30. A selection signal SEL is supplied to the gate electrode of the selection transistor 440. By the selection transistor 440 entering a conductive state in response to the selection signal SEL, the pixel 10 enters a selected state, and the signal outputted from the amplification transistor 430 is transmitted to the vertical signal line 30.

The circuit configuration of the pixel 10 is not limited to the configuration illustrated in FIG. 2. For example, it may be connected between the selection transistor 440, the power supply potential 460 and the amplification transistor 430. Further, in the configuration illustrated in FIG. 2, a so-called 4-Transistor (4-Tr.) configuration comprising the transfer transistor 410, the reset transistor 455, the amplification transistor 430, and the selection transistor 440 has been illustrated as the pixel 10, but limitation is not made to this. For example, the configuration may be a 3-Tr. configuration in which the selection transistor 440 is omitted and the amplification transistor 430 also functions as a selection transistor. Further, depending on the specifications and the like required for the photoelectric conversion device 1000, configuration may be a 5 Tr. configuration having an increased number of transistors. Outputs may be performed from the pixel 10 in the order of: a reset signal at the time of resetting the potential of the node 420 by the reset transistor 455 to reset the photoelectric conversion element 400, and then a data signal, which is a signal level at the time the photoelectric conversion was performed in the photoelectric conversion element 400.

Figure 3:
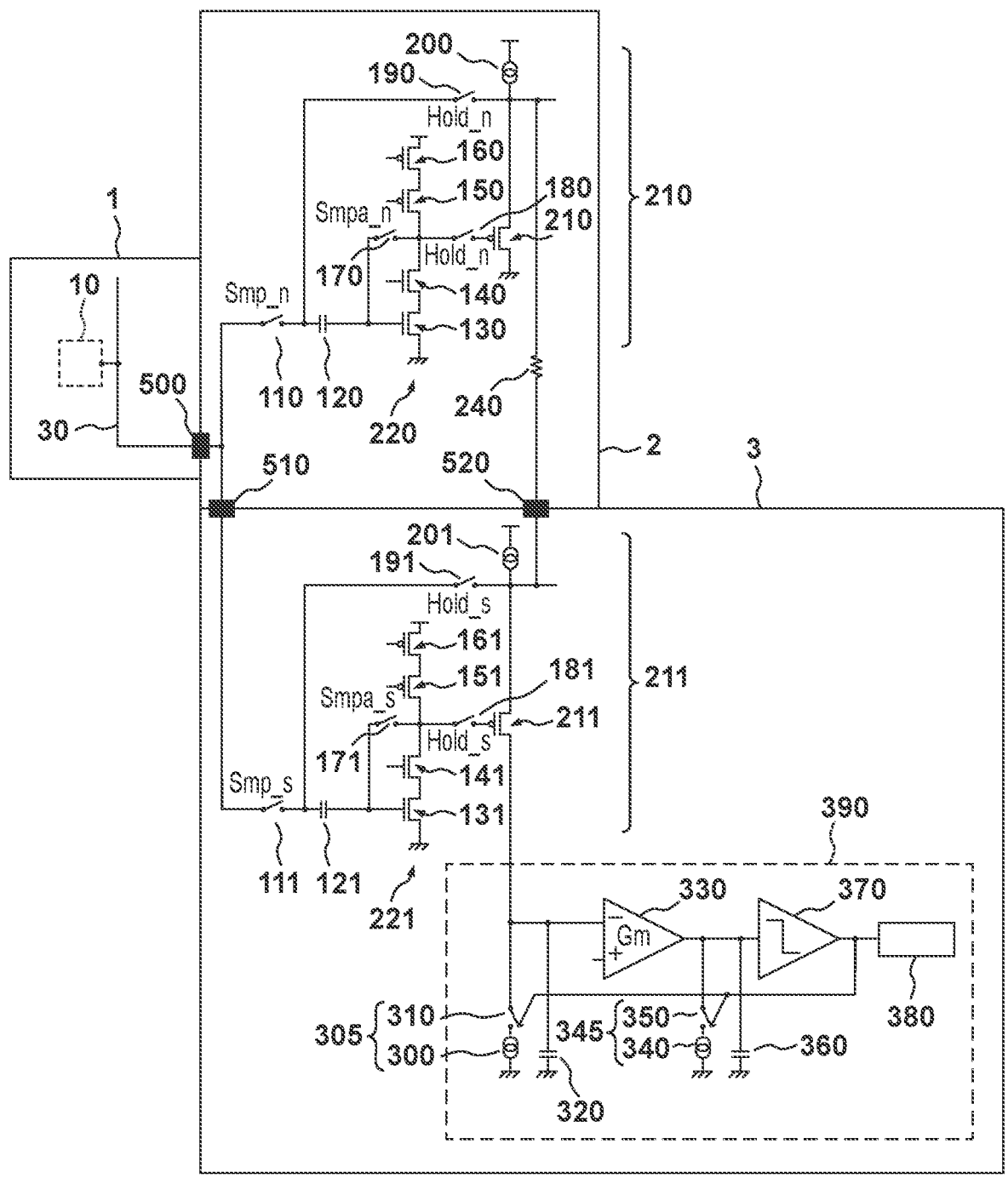
FIG. 3 is a circuit diagram illustrating an example of a configuration of a sample-and-hold unit and a conversion unit of the photoelectric conversion device of FIG. 1.
Figure 4:
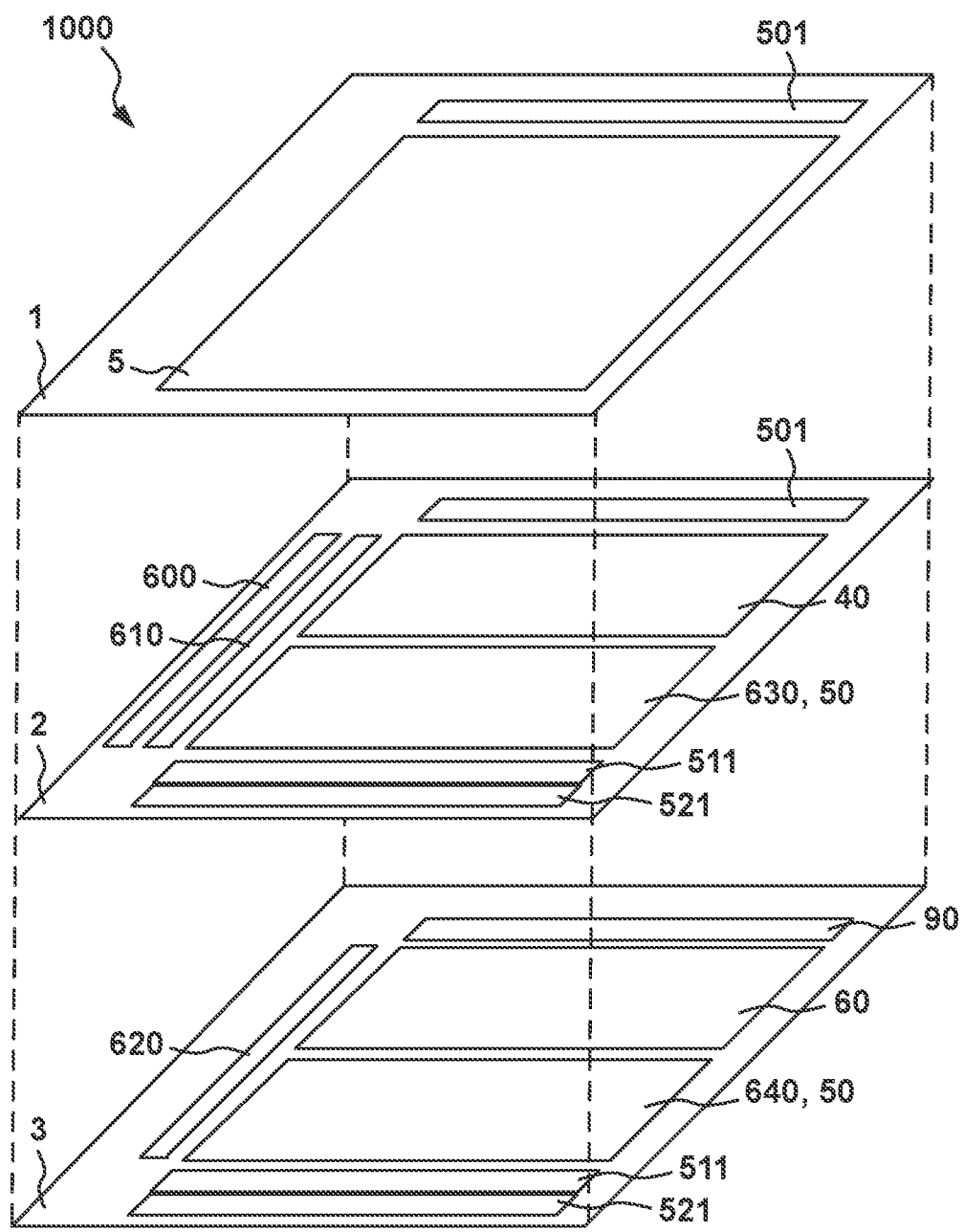
FIG. 4 is a diagram illustrating an example of an arrangement of the respective configurations of the photoelectric conversion device of FIG. 1.

Next, the structure of the photoelectric conversion device 1000 will be described with reference to FIGS. 3 and 4. FIG. 3 is a diagram illustrating an example of a configuration of a circuit focusing on the sample-and-hold unit 50 and the conversion unit 60 of the photoelectric conversion device 1000. FIG. 3 illustrates a sample-and-hold circuit and an analog-to-digital conversion circuit disposed corresponding to one vertical signal line 30 in the sample-and-hold unit 50 and the conversion unit 60. FIG. 4 is a diagram illustrating an example of an arrangement of the respective configurations of the photoelectric conversion device 1000 on the substrate. As illustrated in FIG. 4, the photoelectric conversion device 1000 of the present embodiment is an image sensor having a stacked structure in which a plurality of substrates are stacked.

As illustrated in FIG. 3, in the sample-and-hold unit 50, a sample-and-hold circuit 210 for sampling and holding the reset signal and a sample-and-hold circuit 211 for sampling and holding the data signal are connected to one vertical signal line 30. Further, in the conversion unit 60, one analog-to-digital conversion circuit 390 is connected corresponding to one vertical signal line 30. If the number of vertical signal lines 30 is increased by an increase in pixels or the like, the number of sample-and-hold circuits 210 and 211 and the analog-to-digital conversion circuit 390 will be increased by the number of vertical signal lines 30. Therefore, the circuit scale of the photoelectric conversion device 1000 increases. Thus, in the present embodiment, with respect to the increase in circuit scale, having a configuration in which a plurality of semiconductor substrates are stacked makes it possible to reduce constraints such as the arrangement of the respective components formed on the substrate as well as reduce the size of the chip area.

In the present embodiment, as illustrated in FIGS. 3 and 4, three substrates 1, 2 and 3 are stacked in the photoelectric conversion device 1000. The substrates 1, 2, and 3 may be configured to include a semiconductor substrate using a semiconductor such as silicon and a wiring layer. The substrate 1 includes the pixel portion 5 in which the pixels 10 are arranged in an array. Further, the respective components such as the current source 40, the sample-and-hold unit 50, the conversion unit 60, and the data processing unit 90 are disposed on the substrates 2 and 3. As described above, with regard to the sample-and-hold unit 50 and the conversion unit 60, the circuit scale may be increased corresponding to the number of vertical signal lines 30. Therefore, in the present embodiment, one part and another part of a group configured by the sample-and-hold unit 50 and the conversion unit 60 are made to be arranged on different substrates 2 and 3 from each other. This makes it possible to reduce constraints such as the arrangement of the respective components formed on the substrate as well as reduce the size of the chip area. The reduction of the chip area may also improve circuit integration and contribute to an increase in speed by shortening the wiring pattern for transferring signals.

As illustrated in FIG. 4, the pixel portion 5 is disposed in the substrate 1. The current source 40 and a portion 630, which is a part of the sample-and-hold unit 50, are disposed on the substrate 2. Further, a vertical scanning circuit 600 for controlling the operation of the pixel portion 5 and a control unit 610 for controlling the current source 40 and the portion 630 are disposed on the substrate 2. A via portion 501 in which a via 500 for electrically connecting the pixel portion 5 and the sample-and-hold unit 50 are arranged is disposed between the substrate 1 and the substrate 2. A portion 640, which is a remaining portion of the sample-and-hold unit 50, the conversion unit 60, and the data processing unit 90 are disposed on the substrate 3. Further, a control unit 620 for controlling the portion 640, the conversion unit 60, and the data processing unit 90 is disposed on the substrate 3. In the configuration illustrated in FIG. 4, the conversion unit 60 is disposed on one substrate 3. Via portions 511 and 521 in which vias 510 and 520 for electrically connecting the portion 630 and the portion 640 of the sample-and-hold unit 50 are arranged are disposed between the substrate 2 and the substrate 3.

Next, the circuit configuration of the sample-and-hold unit 50 and the conversion unit 60 will be described with reference to FIG. 3. On the substrate 2, the sample-and-hold circuit 210 for reset signal is disposed corresponding to the portion 630, which is a part of the sample-and-hold unit 50. The sample-and-hold circuit 210 includes a capacitive element 120 and an inverting amplifier 220. A switch 110 controls the connection between the vertical signal line 30 and the capacitive element 120 in accordance with the control signal Smp_n. The inverting amplifier 220 may be constructed by a combination of a grounded source circuit and a source follower circuit. The inverting amplifier 220 includes transistors 130, 140, 150, and 160; switches 170, 180, and 190; and a current source 200. The switch 170 is connected between the inverting input terminal and output terminal of the inverting amplifier 220 and is controlled by the control signal Smpa_n. The reset signal is outputted from the inverting amplifier 220 in accordance with the control signal Hold_n. The substrate 2 includes a via 500, which is an input unit to which an analog signal is inputted from the pixel 10 of the substrate 1, and a via 520, which is an output unit which outputs the analog signal to the substrate 3 comprising an analog-to-digital conversion circuit. The connection structures are different between the via 500 and the via 520. Specifically, in the via 500, a metal part provided in the wiring layer of the substrate 1 and the metal part provided in the wiring layer of the substrate 2 are bonded to each other. Then, an insulating layer of the wiring layer of the substrate 1 and an insulating layer of the wiring layer of the substrate 2, which are located in the same layer as the respective metal parts of the substrate 1 and the substrate 2, are also bonded to each other. A so-called hybrid bonding for bonding such metal parts to each other and insulating layers to each other can be employed. These metal parts are typically made of copper. Meanwhile, the via 520 is provided with a metal member penetrating the semiconductor substrate of the substrate 2, and this metal member can be configured to reach the wiring layer or the semiconductor substrate of the substrate 3. Such a metal member is also referred to as TSV structure (Through Silicon Via) when the semiconductor substrate is mainly silicon. Similarly, a TSV structure may be used for the via 510. Incidentally, the via 500 may be of a TSV structure, and the vias 510 and 520 may be of a hybrid bonding structure. As described above, a structure for connecting the substrates to each other between the substrate 1 and the substrate 2, and a structure for connecting the substrates to each other between the substrate 2 and the substrate 3, may be different from each other.

On the substrate 3, the sample-and-hold circuit 211 for data signal is disposed corresponding to the portion 640, which is a part of the sample-and-hold unit 50. The sample-and-hold circuit 211 may have a configuration similar to that of the sample-and-hold circuit 210 for reset signal. More specifically, the sample-and-hold circuit 211 includes a capacitive element 121 and an inverting amplifier 221. A switch 111 controls the connection between the vertical signal line 30 and the capacitive element 121 in accordance with the control signal Smp_s. The inverting amplifier 221 may be constructed by a combination of a grounded source circuit and a source follower circuit. The inverting amplifier 221 includes transistors 131, 141, 151, and 161; switches 171, 181, and 191; and a current source 201. The switch 171 is connected between the inverting input terminal and output terminal of the inverting amplifier 221 and is controlled by the control signal Smpa_n. The data signal is outputted from the inverting amplifier 221 in accordance with the control signal Hold_s.

The via 510 by which signal inputted to the sample-and-hold circuit 211 of the sample-and-hold unit 50 is transferred is disposed between the substrate 2 and the substrate 3. The via 510 can also be said to constitute a part of the vertical signal line 30. Also, the via 520, which connects the output terminal of the sample-and-hold circuit 210 and the output terminal of the sample-and-hold circuit 211 in the sample-and-hold unit 50, is disposed between the substrate 2 and the substrate 3. That is, with respect to one vertical signal line 30, the substrate 2 and the substrate 3 of the photoelectric conversion device 1000 illustrated in FIGS. 3 and 4, are electrically connected by two vias: vias 510 and 520.

As illustrated in FIG. 3, a resistive element 240 is disposed between the output terminal of the sample-and-hold circuit 210 for reset signal and the output terminal of the sample-and-hold circuit 211 for the data signal. Thus, assuming that the potential of the output terminal of the sample-and-hold circuit 210, that is, the potential of a reset signal, is Vn; the potential of the output terminal of the sample-and-hold circuit 211, that is, the potential of a data signal, is Vs; and the resistance value of a resistive element 143 is R, a current I flowing through the resistive element 143 is expressed as:

$$I=(Vn-Vs)/R$$

This current I is inputted to the analog-to-digital conversion circuit 390. At this time, since the current I flowing through the resistive element 143 is proportional to the difference between the potential Vn of the reset signal and the potential Vs of the data signal of the pixel signal, CDS is performed at the stage at which the current I is inputted to the analog-to-digital conversion circuit 390 of the conversion unit 60.

The ΔΣ analog-to-digital conversion circuit 390 is disposed on the substrate 3 as the conversion unit 60 so as to correspond to one vertical signal line 30. The conversion unit 60 may be a ΔΣ analog-to-digital conversion unit in which the ΔΣ analog-to-digital conversion circuit 390 is disposed corresponding to the respective vertical signal lines 30. The ΔΣ analog-to-digital conversion circuit 390 includes a first integrator, a second integrator, a quantizer 370, and a decimation filter 380. In the analog-to-digital conversion circuit 390, the first integrator is configured by an integration capacitor 320. The second integrator is configured by a Gm cell 330 for converting a voltage into a current and an integration capacitor 360. A digital-to-analog converter 305 including a current source 300 and a switch 310 is connected to the input node of the first integrator. The digital-to-analog converter 305 controls the current to the first integrator in response to the digital signal via the second integrator and the quantizer 370. A digital-to-analog converter 345 including a current source 340 and a switch 350 is connected to the input node of the second integrator. The digital-to-analog converter 345 controls the current to the second integrator in response to the result of quantizing an output of the second integrator in the quantizer 370.

In the ΔΣ analog-to-digital conversion circuit 390, the operation of feeding back a previous quantized value to the second integrator and the first integrator via the digital-to-analog converters 305 and 345 is performed in the quantizer 370. Thus, the second-order noise-shaping characteristics can be obtained by passing the integrator twice while feeding back the previous quantized value to the digital-to-analog converters 304 and 345. Furthermore, by removing the high-frequency noise by the decimation filter 380 disposed subsequent to the quantizer 370, it is possible to obtain an accurate analog-to-digital conversion output.

Figure 5:
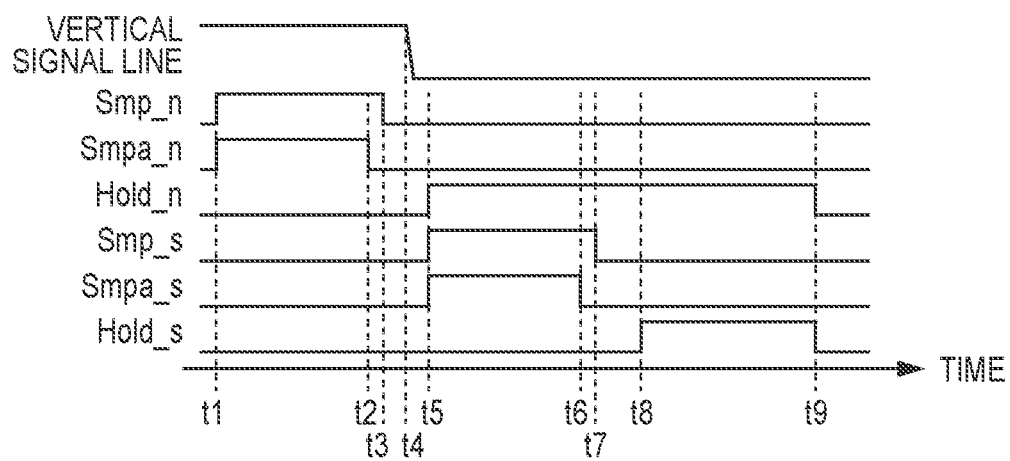
FIG. 5 is a timing chart illustrating an example of operation of the respective switches of the sample-and-hold circuit of the photoelectric conversion device of FIG. 1.

FIG. 5 is a timing chart illustrating an example of operation of the respective switches of the sample-and-hold circuits 210 and 211. FIG. 5 illustrates the potential of the vertical signal line 30 and the respective waveforms of the control signals of the respective switches of the sample-and-hold circuits 210 and 211: Smp_n, Smpa_n, Hold_n, Smp_s, Smpa_s, and Hold_s. Description will be given assuming that, with regard to the waveforms of FIG. 5, while the control signal is at a high level, the corresponding switch is in an on state (conductive state), and while the control signal is at a low level, the corresponding switch is in an off state (non-conductive state).

First, at time t1, the control signals Smp_n and Smpa_n become a high level, and in the sample-and-hold circuit 210 for reset signal, the switches 110 and 170 enter an on state. Then, at time t2 at which the control signal Smpa_n transitions from a high level to a low level, the potential Vn of the reset signal is sampled and accumulated in the capacitive element 120.

Next, at time t3, the control signal Smp_n transitions from a high level to a low level, and at time t4, the signal generated by the photoelectric conversion element 400 is outputted from the pixel 10 to the vertical signal line 30. Next, at time t5, the control signals Smp_s and Smpa_s become a high level, and in the sample-and-hold circuit 211 for data signal, the switches 110 and 170 enter an on state. Then, at time t6 at which the control signal Smpa_s transitions from a high level to a low level, the data signal Vs is sampled and accumulated in the capacitive element 120.

In the period for sampling the data signal, the control signal Hold_n becomes a high level, and by the switches 180 and 190 entering an on state, the capacitive element 120 holds the potential Vn of the reset signal in the sample-and-hold circuit 210. The electric charge sampled and held in the capacitive element 120 is outputted from the sample-and-hold circuit 210 for reset signal.

Then, at time t7 at which the control signal Smp_s transitions from a high level to a low level, the potential Vn of the data signal is sampled and accumulated in the capacitive element 120. At time t8, the control signal Hold_s becomes a high level, and by the switches 181 and 191 entering an on state, the capacitive element 121 holds the potential Vs of the data signal in the sample-and-hold circuit 211. The electric charge sampled and held in the capacitive element 121 is outputted from the sample-and-hold circuit 210 for data signal.

As described above, a current corresponding to the difference between the potential Vn of the reset signal at the output terminal of the sample-and-hold circuit 210 and the potential Vs of the data signal at the output terminal of the sample-and-hold circuit 211 is inputted to the analog-to-digital conversion circuit 390. Then, at time t9, the control signals Hold_n and Hold_s become a low level, and the sampling of the reset signal and the data signal of the next pixel 10 is started.

As described above, in the photoelectric conversion device 1000, a part of the sample-and-hold unit 50 is disposed on the substrate 3 on which the conversion unit 60 is disposed. Thus, even when the circuit scale of the photoelectric conversion device 1000 is increased, constraints on the configuration such as the arrangement of these circuits formed on the substrate are reduced, and the degree of freedom in designing the photoelectric conversion device 1000 is increased. Further, stacking the substrate 1 on which the pixel portion 5 is disposed and the substrates 2 and 3 on which the sample-and-hold unit 50 and the conversion unit 60 are disposed makes it possible to improve circuit integration and realize reduction of chip area and high-speed. As a result, the performance of the photoelectric conversion device 1000 can be improved.

In the configuration illustrated in FIGS. 3 and 4, an example in which the sample-and-hold circuit 210 for reset signal is disposed on the substrate 2 and the sample-and-hold circuit 211 for data signal is disposed on the substrate 3 has been described, but limitation is not made to this. For example, the sample-and-hold circuit 211 for data signal may be disposed on the substrate 2 and the sample-and-hold circuit 210 for reset signal may be disposed on the substrate 3. In other words, configuration may be such that the sample-and-hold circuit 210 and the sample-and-hold circuit 211 are disposed on different substrates 2 and 3 from each other and either the sample-and-hold circuit 210 or the sample-and-hold circuit 211 is disposed on the substrate 3 on which the conversion unit 60 is disposed.

Further, for example, configuration may be such that the sample-and-hold circuit 210 and the sample-and-hold circuit 211 connected to some of the plurality of vertical signal lines 30 disposed in the photoelectric conversion device 1000 are disposed on the substrate 2 and the sample-and-hold circuit 210 and the sample-and-hold circuit 211 connected to other vertical signal lines 30 are disposed on the substrate 3. Variations in the characteristics, such as the tendency of variations at the time of manufacturing, of the respective elements, such as transistors, constituting the photoelectric conversion device 1000 may be different between the substrates. Therefore, if the sample-and-hold circuit 210 and the sample-and-hold circuit 211 are arranged on separate substrates, there is a possibility that the characteristics may change in the sample-and-hold circuit 210 and the sample-and-hold circuit 211 and the CDS performance may be reduced. Meanwhile, when the sample-and-hold circuit 210 for reset signal and the sample-and-hold circuit 211 for data signal are arranged on the same substrate 2, variations in the characteristics of the elements may have a similar tendency in the neighboring circuits. Therefore, the sample-and-hold circuit 210 and the sample-and-hold circuit 211 are distributed between and arranged on the substrate 2 and the substrate 3 in accordance with the vertical signal line 30 to which they are connected. Thus, CDS characteristics can be improved than when the sample-and-hold circuit 210 and the sample-and-hold circuit 211 connected to the same vertical signal line 30 are disposed on separate substrates.

Figure 6:
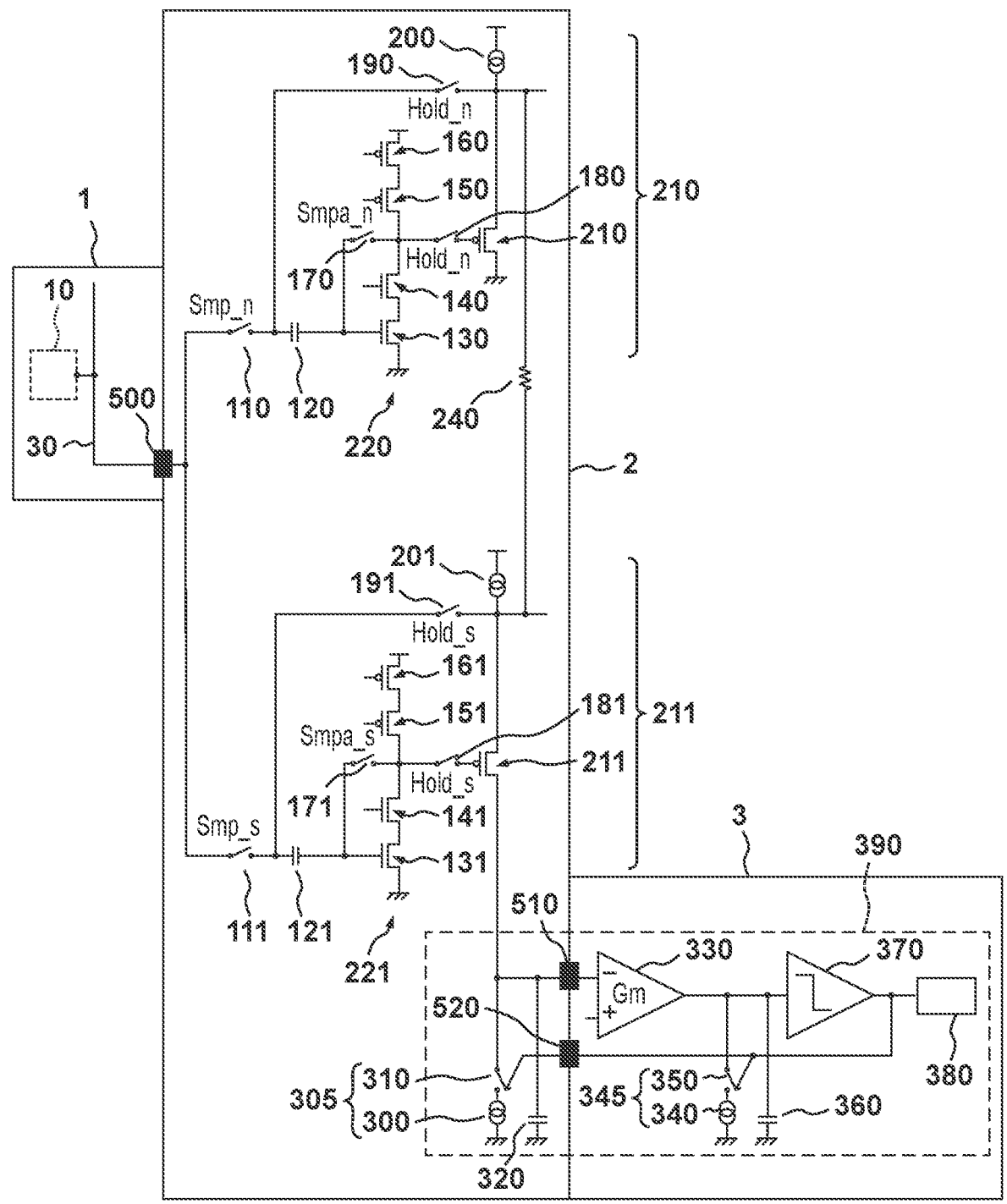
FIG. 6 is a circuit diagram illustrating an example of a configuration of a sample-and-hold unit and a conversion unit of the photoelectric conversion device of FIG. 1.
Figure 7:
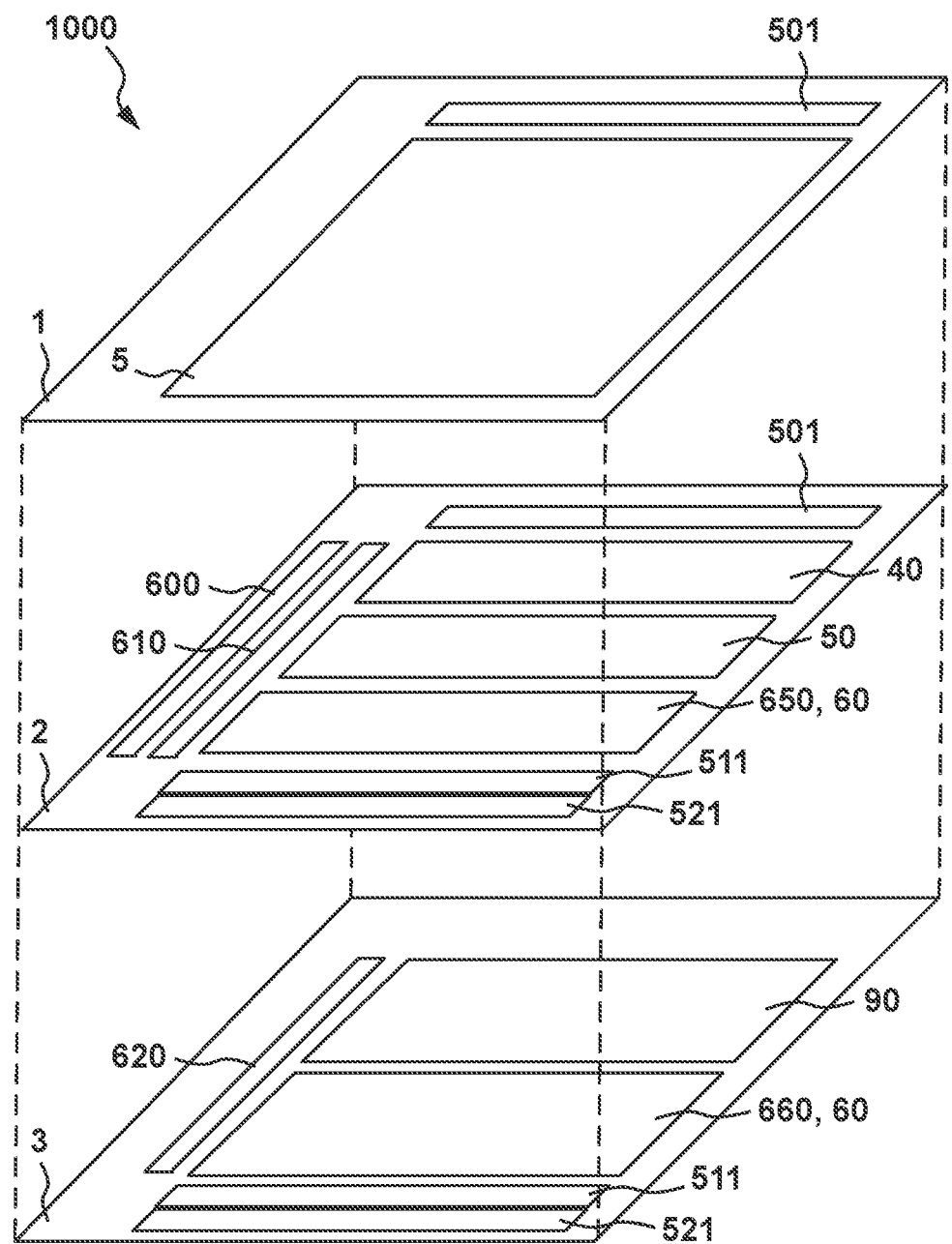
FIG. 7 is a diagram illustrating an example of an arrangement of the respective configurations of the photoelectric conversion device of FIG. 1.

Next, a variation of the structure of the photoelectric conversion device 1000 illustrated in FIGS. 3 and 4 will be described. FIG. 6 is a diagram illustrating an example of a configuration of a circuit focusing on the sample-and-hold unit 50 and the conversion unit 60 of the photoelectric conversion device 1000. FIG. 7 is a diagram illustrating an example of an arrangement of the respective configurations of the photoelectric conversion device 1000 on the substrate. In the configuration illustrated in FIGS. 3 and 4, the configuration in which the sample-and-hold unit 50 is disposed over two substrates, the substrates 2 and 3, has been described. On the other hand, in the configuration illustrated in FIGS. 6 and 7, the sample-and-hold unit 50 is disposed on one substrate 2. On the other hand, the conversion unit 60 is disposed over two substrates: the substrates 2 and 3.

The first integrator configured by the integration capacitor 320 in the analog-to-digital conversion circuit 390 and the digital-to-analog converter 305 are disposed corresponding to a portion 650, which is a portion of the conversion unit 60, on the substrate 2. The configuration other than the first integrator in the analog-to-digital conversion circuit 390 and the digital-to-analog converter 305 is disposed corresponding to a portion 660, which is a portion of the conversion unit 60, on the substrate 3. Therefore, a via portion 511 in which the via 510 for electrically connecting the sample-and-hold unit 50 and the Gm cell 330 are arranged and a via portion 521 in which the via 520 for transferring the control signal of the digital-to-analog converter 305 are arranged are disposed between the substrate 2 and the substrate 3. Further, in the configuration illustrated in FIGS. 6 and 7, the control unit 610 disposed on the substrate 2 may control the current source 40, the sample-and-hold unit 50, and the portion 650 of the conversion unit 60, and the control unit 620 disposed on the substrate 3 may control the portion 660 of the conversion unit 60 and the data processing unit 90.

In the configuration illustrated in FIGS. 6 and 7, the sample-and-hold circuit 210 for reset signal and the sample-and-hold circuit 211 for data signal are disposed on the same substrate 2. As described above, variations in the characteristics of the respective elements, such as transistors, constituting the photoelectric conversion device 1000 may be different between the substrates. Therefore, regarding the configuration illustrated in FIGS. 6 and 7 in which the sample-and-hold circuit 210 and the sample-and-hold circuit 211 connected to the same vertical signal line 30 are disposed on one substrate 2, CDS characteristics can be improved as compared with the configuration illustrated in FIGS. 2 and 3.

Further, in the configuration illustrated in FIGS. 6 and 7, although the second-order ΔΣ analog-to-digital conversion circuit is illustrated as the analog-to-digital conversion circuit 390, in order to further enhance the accuracy of the analog-to-digital conversion there are cases where the third or higher order configuration is required. Further, for example, in the photoelectric conversion device 1000, in order to execute various processes, there may be cases where it is necessary to increase the circuit scale of the data processing unit 90. In such cases, a portion of the conversion unit 60 is disposed on the substrate 2 on which the sample-and-hold unit 50 is disposed, so that the degree of freedom in designing the photoelectric conversion device 1000 can be increased. Further, as illustrated in FIG. 6, the first integrator of the analog-to-digital conversion circuit 390 and the digital-to-analog converter 305 are disposed on the substrate 2, but limitation is not made to this. For example, configurations other than the first integrator of the analog-to-digital conversion circuit 390 and the digital-to-analog converter 305 may be disposed on the substrate 2. Further, for example, configuration may be such that the analog-to-digital conversion circuit 390, which is connected to some of the plurality of vertical signal lines 30 disposed in the photoelectric conversion device 1000, is disposed on the substrate 2 and the analog-to-digital conversion circuit 390 connected to other vertical signal lines 30 is disposed on the substrate 3.

Figure 8:
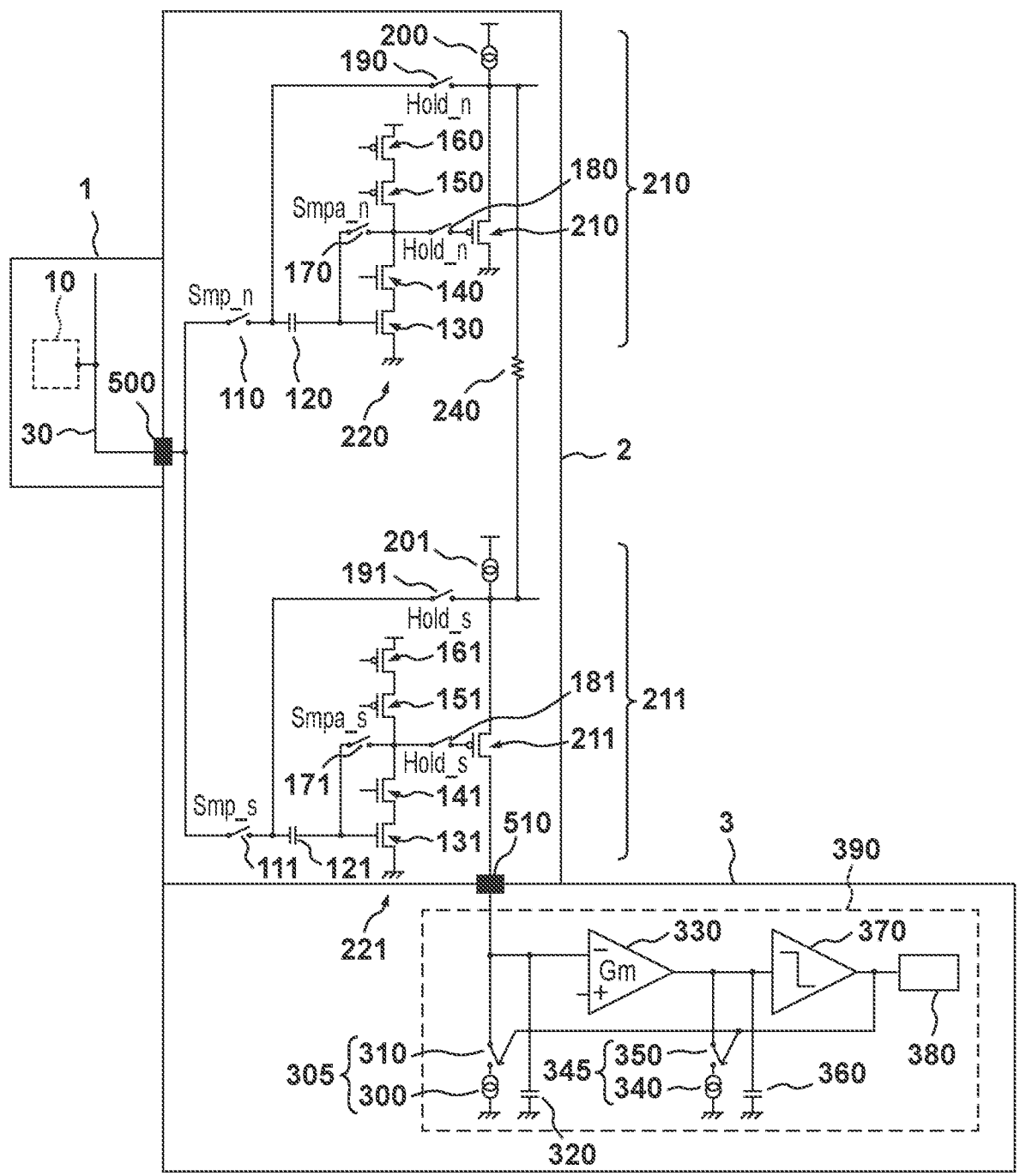
FIG. 8 is a circuit diagram illustrating an example of a configuration of a sample-and-hold unit and a conversion unit of the photoelectric conversion device of FIG. 1.
Figure 9:
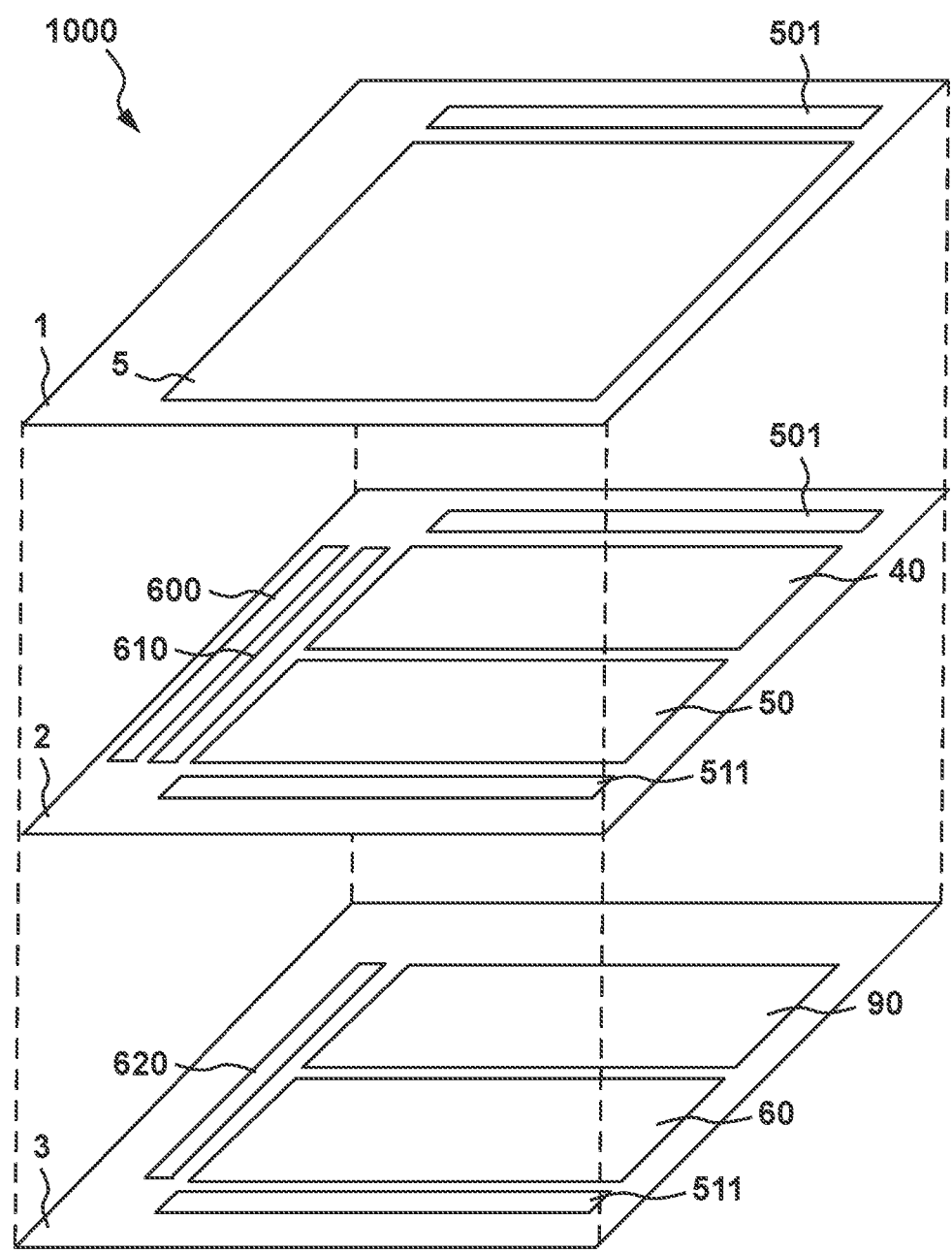
FIG. 9 is a diagram illustrating an example of an arrangement of the respective configurations of the photoelectric conversion device of FIG. 1.

Next, a variation of the photoelectric conversion device 1000 will be described with reference to FIGS. 8 and 9. FIG. 8 is a diagram illustrating an example of a configuration of a circuit focusing on the sample-and-hold unit 50 and the conversion unit 60 of the photoelectric conversion device 1000. FIG. 9 is a diagram illustrating an example of an arrangement of the respective configurations of the photoelectric conversion device 1000 on the substrate. In the configuration illustrated in FIGS. 8 and 9, the sample-and-hold unit 50 is disposed on one substrate, and the conversion unit 60 is disposed on one substrate 3. Therefore, the via portion 511 in which the via 510 for electrically connecting the sample-and-hold unit 50 and the conversion unit 60 are arranged is disposed between the substrate 2 and the substrate 3. Further, in the configuration illustrated in FIGS. 8 and 9, the control unit 610 disposed on the substrate 2 may control the current source 40 and the sample-and-hold unit 50, and the control unit 620 disposed on the substrate 3 may control the conversion unit 60 and the data processing unit 90.

In the configuration illustrated in FIGS. 8 and 9, the sample-and-hold circuit 210 for reset signal and the sample-and-hold circuit 211 for data signal are disposed on the same substrate 2. Thus, as described above, CDS characteristics can be improved than when the sample-and-hold circuit 210 and the sample-and-hold circuit 211 connected to the same vertical signal line 30 are disposed on separate substrates.

Further, in the configuration illustrated in FIGS. 3 and 6 described above, the connection between the substrate 2 and the substrate 3 is connected by two vias 510 and 511 with respect to one vertical signal line 30. On the other hand, in the configuration illustrated in FIG. 8, the connection between the substrate 2 and the substrate 3 is made by one via 510, which is between the sample-and-hold circuits 210 and 211 and the analog-to-digital conversion circuit 390, with respect to one vertical signal line 30. In other words, the signal output from the sample-and-hold circuit 210 and the sample-and-hold circuit 211 is transferred to the conversion unit 60 via the same via 510 for connecting the substrate 2 on which the sample-and-hold unit 50 is disposed and the substrate on which the sample-and-hold unit 50 is not disposed and the conversion unit 60 is disposed.

In the photoelectric conversion device 1000 having a stacked structure using a plurality of substrates, the yield can be improved in the manufacturing process of the photoelectric conversion device 1000 by reducing the number of vias for electrically connecting the substrates. Further, by the via portions 511 and 512 in which the vias 510 and 520 are arranged being reduced to half, the degree of freedom in arrangement and configuration of other components disposed in the photoelectric conversion device 1000 is improved, and it also becomes possible to realize miniaturization of the photoelectric conversion device 1000.

Figure 10:
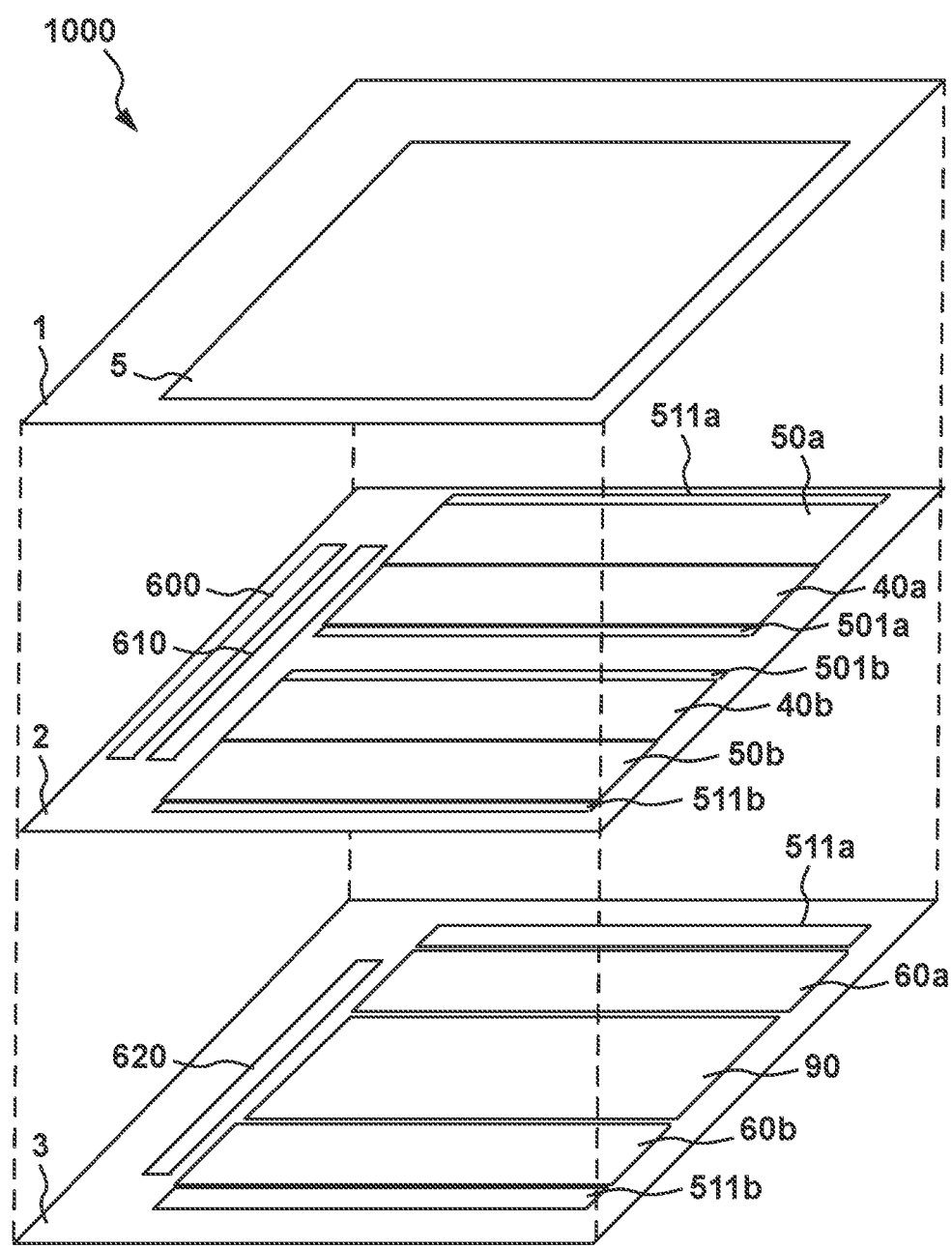
FIG. 10 is a diagram illustrating an example of an arrangement of the respective configurations of the photoelectric conversion device of FIG. 1.

FIG. 10 is a diagram illustrating a variation of the photoelectric conversion device 1000 illustrated in FIG. 9. FIGS. 4, 7, and 9 described above illustrates an arrangement assuming that one vertical signal line 30 is disposed corresponding to each pixel column of the pixels 10 arranged in a matrix in the pixel portion 5. On the other hand, FIG. 10 illustrates an arrangement assuming that a plurality of vertical signal lines 30 are disposed corresponding to one pixel column of the pixel portion 5. By arranging a plurality of vertical signal lines 30 for one pixel column and performing the read operation at the same time, it becomes possible to shorten the time required to read signals from the plurality of pixels 10 disposed in the pixel portion 5 as compared with the case of arranging one vertical signal line 30 for one pixel column. In other words, it is possible to further increase the speed of the photoelectric conversion device 1000.

The configuration illustrated in FIG. 10 illustrates a case of arranging two vertical signal lines 30 for one pixel column. Some of the pixels 10 arranged in one pixel column of the pixel portion 5 are connected to a sample-and-hold unit 50a via a via 500a arranged in a via portion 501a. The signal sampled and held by the sample-and-hold unit 50a is transferred to a conversion unit 60a via a via 510a arranged in a via portion 511a. Also, other pixels 10 arranged in one pixel column of the pixel portion 5 are connected to a sample-and-hold unit 50b via a via 500b arranged in a via portion 501b. The signal sampled and held by the sample-and-hold unit 50b is transferred to a conversion unit 60b via a via 510b arranged in a via portion 511b. Signals analog-to-digital-converted by the conversion units 60a and 60b are subjected to appropriate processing in the data processing unit 90 and are outputted from the output unit 100 (not illustrated).

For example, the signals outputted from half of the pixels 10 arranged in one pixel column may be inputted to the data processing unit 90 via the sample-and-hold unit 50a and the conversion unit 60a. In such a case, the signals outputted from the other half of the pixels 10 arranged in one pixel column may be inputted to the data processing unit 90 via the sample-and-hold unit 50b and the conversion unit 60b. The ratio of allocating the pixels 10 arranged in one pixel column to two vertical signal lines 30 may be determined as appropriate depending on the specification and the like of the photoelectric conversion device 1000.

Figure 11:
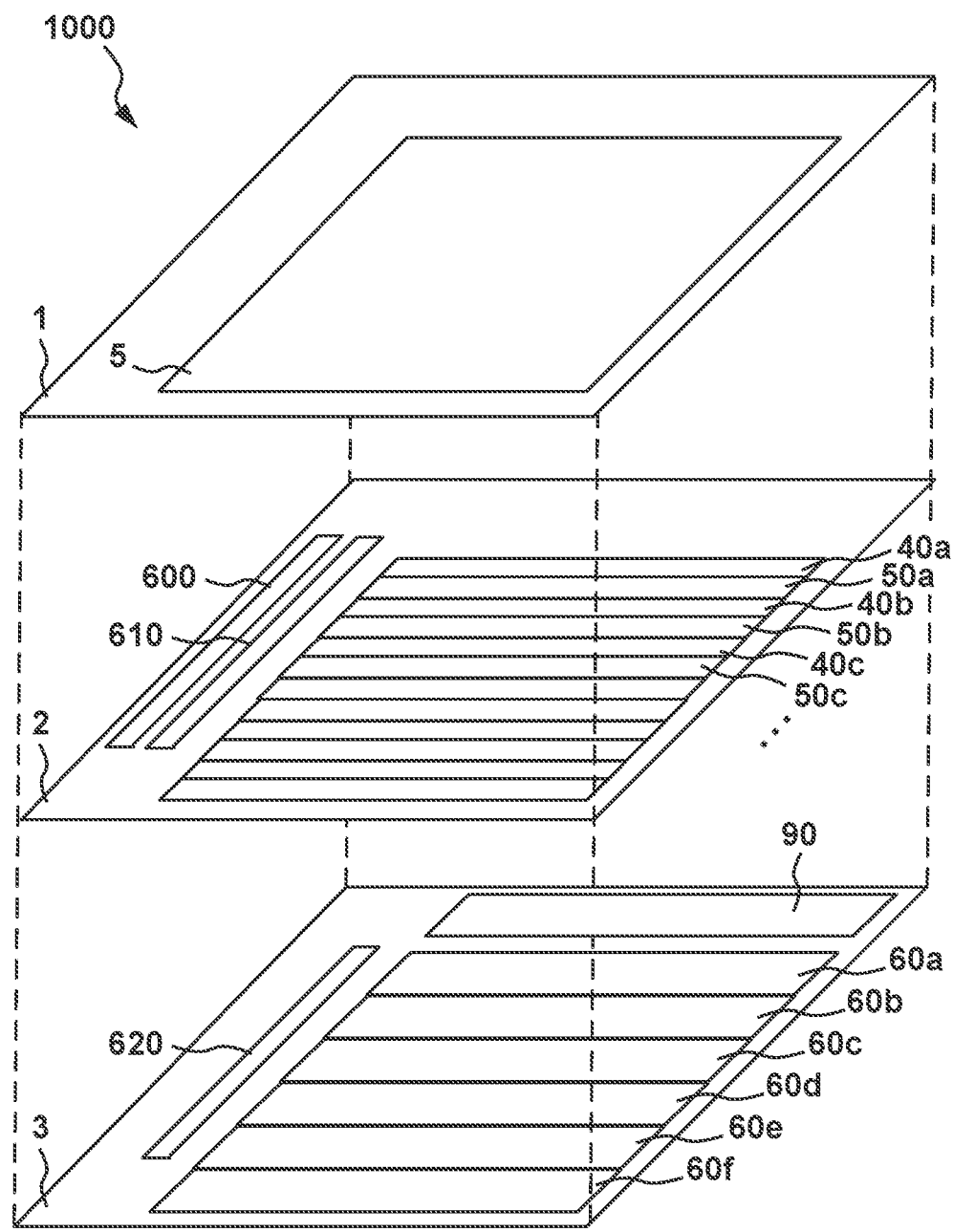
FIG. 11 is a diagram illustrating an example of an arrangement of the respective configurations of the photoelectric conversion device of FIG. 1.

Furthermore, as illustrated in FIG. 11, configuration may be such that more vertical signal lines 30 are disposed for one pixel column and the sample-and-hold circuits 210 and 211 and the analog-to-digital conversion circuit 390 are disposed for the respective vertical signal lines 30. FIG. 11 illustrates a case where six vertical signal lines 30 are arranged for one pixel column. The vertical signal lines 30 are not limited to being arranged according to the pixel columns. A plurality of pixels 10 disposed in the pixel portion 5 may constitute a plurality of pixel units, each including one or more pixels, and a vertical signal line 30 may be disposed corresponding to each of the plurality of pixel units. For example, a plurality of pixels 10, each having sensitivity to red, blue, and green, arranged contiguously in order to obtain a color image may be one pixel unit, and a vertical signal line 30 may be arranged for each pixel unit. Furthermore, for example, a vertical signal line 30 may be arranged for each and every one of pixels 10.

As described above, two sample-and-hold circuits 210 and 211 in the sample-and-hold unit 50 and the analog-to-digital conversion circuit 390 in the conversion unit 60 are disposed for one vertical signal line 30. Therefore, if the number of vertical signal lines 30 is increased as in the configuration illustrated in FIGS. 10 and 11, the circuit scale will be increased. In contrast to this, in the present embodiment, one part and another part of a group configured by the sample-and-hold unit 50 and the conversion unit 60 are made to be arranged on different substrates 2 and 3 from each other. Further, the substrates 2 and 3, on which are arranged groups configured by the sample-and-hold unit 50 and the conversion unit 60, are arranged in a stack. Thus, constraints on the arrangement and configuration of the sample-and-hold circuit 210 and the analog-to-digital conversion circuit 390 as well as other components of the photoelectric conversion device 1000 formed on the substrate are reduced, and the degree of freedom in design of the photoelectric conversion device 1000 is increased. Further, stacking the substrate 1 on which the pixel portion 5 is disposed and the substrates 2 and 3 on which the sample-and-hold unit 50 and the conversion unit 60 are disposed makes it possible to improve circuit integration and realize reduction of chip area and high-speed. As a result, the performance of the photoelectric conversion device 1000 can be improved.

Figure 12:
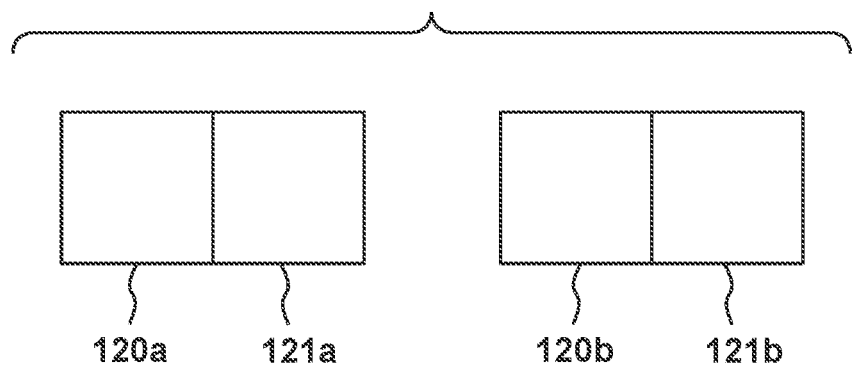
FIG. 12 is a diagram illustrating an example of an arrangement of capacitive elements of the photoelectric conversion device of FIG. 1.

FIG. 12 is a diagram illustrating an example of an arrangement of the capacitive elements 120 and 121 disposed in the sample-and-hold circuits 210 and 211. FIG. 12 illustrates a capacitive element 120a of a sample-and-hold circuit 210a and a capacitive element 121a of a sample-and-hold circuit 211a connected to a vertical signal line 30a (not illustrated), and a capacitive element 120b of a sample-and-hold circuit 210b and a capacitive element 121b of a sample-and-hold circuit 211b connected to a vertical signal line 30b (not illustrated), which is different from the vertical signal line 30a, arranged in the sample-and-hold unit 50. In this case, the distance between the capacitive element 120a included in the sample-and-hold circuit 210a and the capacitive element 121a included in the sample-and-hold circuit 211a may be shorter than the distance between the capacitive element 120a or 121a included in the sample-and-hold circuit 210a or 211a and the capacitive element 120b or 121b included in the sample-and-hold circuit 210b or 211b. Not only between the substrates but also in the substrate, there are cases where the characteristics of the respective elements, such as transistors, constituting the photoelectric conversion device 1000 vary. Therefore, the distance between the capacitive element 120 and the capacitive element 121 of the sample-and-hold circuits 210 and 211 connected to the same vertical signal line 30 for performing CDS processing is arranged to be shorter than the distance from the capacitive elements 120 and 121 connected to the same vertical signal line 30 to the capacitive elements 120 and 121 of the sample-and-hold circuits 210 and 211 connected to another vertical signal line 30. This arrangement may improve the CDS characteristics.

The configurations of the sample-and-hold circuits 210 and 211 are not limited to the above-described configurations. For example, the sample-and-hold circuits 910 and 911 illustrated in FIG. 13 include capacitive elements 720 and 730, output buffers 740 and 750, switches 700 and 710 connected between the vertical signal line 30 and the capacitive elements 720 and 730, and switches 760 and 770 connected between the output buffers 740 and 750 and an analog-to-digital conversion circuit 990 of the conversion unit 60. The sample-and-hold circuits 910 and 911 illustrated in FIG. 13 has a fewer number of elements and a simpler configuration than the sample-and-hold circuits 210 and 211 described above.

Figure 13:
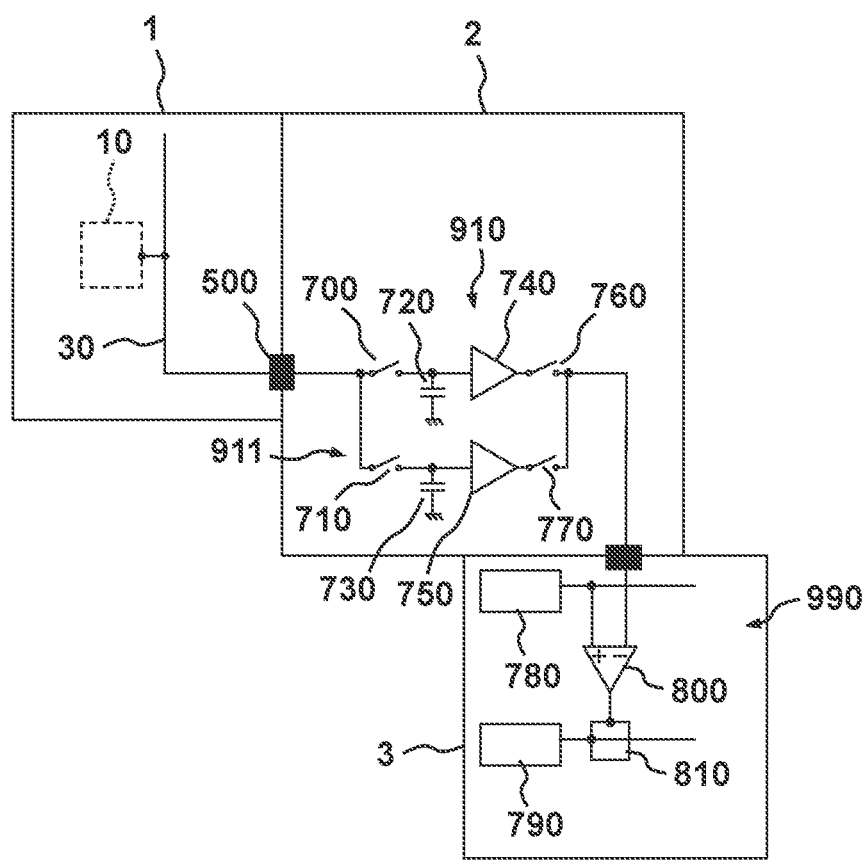
FIG. 13 is a circuit diagram illustrating an example of a configuration of a sample-and-hold unit and a conversion unit of the photoelectric conversion device of FIG. 1.

Further, the analog-to-digital conversion circuit disposed in the conversion unit 60 is not limited to the ΔΣ analog-to-digital conversion circuit 390 described above. For example, as illustrated in FIG. 13, the analog-to-digital conversion circuit 990 may be a slope (single-slope) analog-to-digital conversion circuit. The analog-to-digital conversion circuit 990 may include a ramp wave generation unit 780, a counter 790, a comparator 800, and an output unit 810. Further, for example, a parallel approximation or successive approximation analog-to-digital conversion circuit may be used as an analog-to-digital conversion circuit. The respective components of the photoelectric conversion device 1000, such as the sample-and-hold circuits 210 and 211 used in the sample-and-hold unit 50 and an analog-to-digital conversion circuit used in the conversion unit 60, may be set as appropriate depending on the specification and the like of the photoelectric conversion device 1000.

Figure 14:
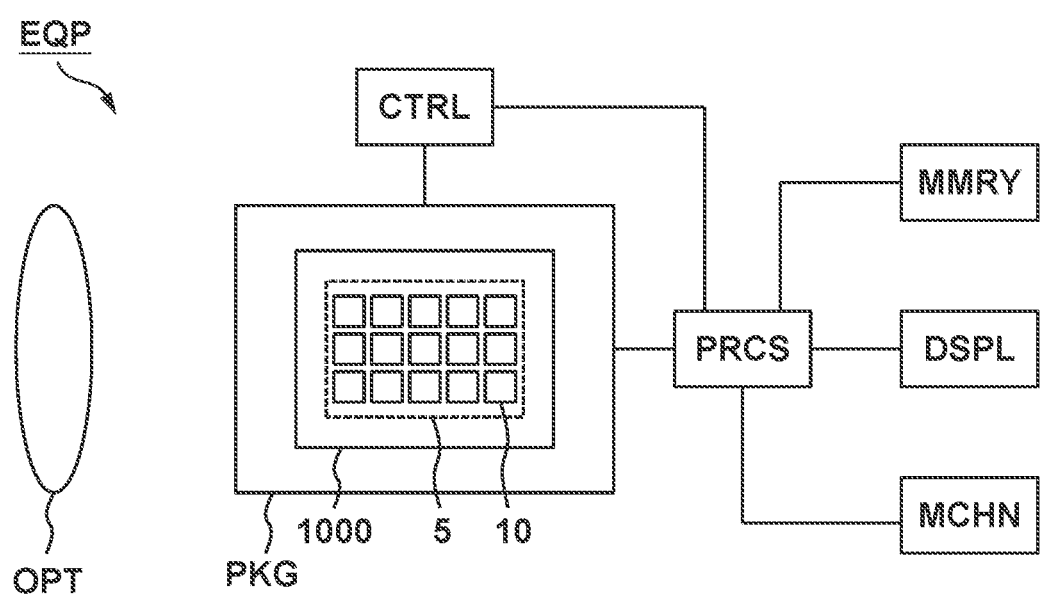
FIG. 14 is a diagram illustrating an example of a configuration of a camera in which the photoelectric conversion device of the present embodiment is integrated.

An example of application of the photoelectric conversion device 1000 according to the above-described embodiment will be described below. FIG. 14 is a schematic diagram of an electronic device EQP equipped with the photoelectric conversion device 1000. FIG. 14 illustrates a camera as an example of the electronic device EQP. Here, the concept of a camera includes not only a device whose main purpose is imaging, but also a device (e.g., a personal computer and a portable terminal such as a smartphone) having an auxiliary imaging function.

The photoelectric conversion device 1000 may be a semiconductor chip having a stacked structure in which the pixel portion 5 is provided. The photoelectric conversion device 1000 is housed in a semiconductor package PKG as illustrated in FIG. 14. The package PKG may include a substrate on which the photoelectric conversion device 1000 is fixed, a lid such as glass facing the photoelectric conversion device 1000, and a conductive connecting member such as a bonding wire or a bump that connects a terminal provided on the substrate and a terminal provided on the photoelectric conversion device 1000. The device EQP may further comprise at least one of an optical system OPT, a control device CTRL, a processing device PRCS, a display device DSPL, and a storage device MMRY.

The optical system OPT is intended to form an image on the photoelectric conversion device 1000, and may be, for example, a lens, a shutter, and a mirror. The control device CTRL controls the operation of the photoelectric conversion device 1000 and may be, for example, a semiconductor device such as an ASIC. The processing device PRCS processes signals outputted from the photoelectric conversion device 1000 and may be a semiconductor device such as a CPU or an ASIC. The display device DSPL may be an EL display device or a liquid crystal display device for displaying image data obtained by the photoelectric conversion device 1000. The storage device MMRY is a magnetic device or a semiconductor device that stores image data obtained by the photoelectric conversion device 1000. The storage device MMRY can be a volatile memory, such as a SRAM or DRAM, or a non-volatile memory, such as a flash memory or a hard disk drive. A mechanical device MCHN has moving parts, such as motors and engines, or a propulsion unit. The mechanical device MCHN in cameras can drive components of the optical system OPT for zooming, focusing, and shutter operation. In the device EQP, the image data outputted from the photoelectric conversion device 1000 is displayed on the display device DSPL or transmitted to an external unit by a communication device (not illustrated) provided in the device EQP. Therefore, the device EQP may be provided with a storage device MMRY or a processing device PRCS.

Cameras in which the photoelectric conversion device 1000 is integrated can be adopted as surveillance cameras; vehicle-mounted cameras mounted on transportation devices such as automobiles, railway vehicles, ships, aircrafts, and industrial robots; and the like. In addition, cameras in which the photoelectric conversion device 1000 are integrated can be adopted not only in transportation device but widely in devices that utilize object recognition, such as Intelligent Transport Systems (ITS).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-016892, filed Feb. 4, 2021 which is hereby incorporated by reference herein in its entirety.

What is claimed is:

1. A photoelectric conversion device comprising:
    a pixel portion in which a plurality of pixels, each including a photoelectric conversion element, are arranged in a matrix;
    a sample-and-hold unit configured to sample a signal generated in the photoelectric conversion element via a vertical signal line from the pixel portion and hold the signal; and
    a conversion unit configured to perform an analog-to-digital conversion on a signal outputted from the sample-and-hold unit,
    wherein in the sample-and-hold unit, a first sample-and-hold circuit that samples a signal for when the photoelectric conversion element is reset and a second sample-and-hold circuit that samples a signal for when a photoelectric conversion operation is performed in the photoelectric conversion element are connected to one vertical signal line,
    wherein the pixel portion is arranged on a first substrate,
    wherein a part of a group, the group being configured by the sample-and-hold unit and the conversion unit, is arranged on a second substrate,
    wherein another part of the group is arranged on a third substrate,
    wherein in the sample-and-hold unit, a third sample-and-hold circuit is connected to a vertical signal line different from the one vertical signal line, and
    wherein a distance between a capacitive element included in the first sample-and-hold circuit and a capacitive element included in the second sample-and-hold circuit is shorter than a distance between the capacitive element included in the first sample-and-hold circuit and a capacitive element included in the third sample-and-hold circuit.

2. The photoelectric conversion device according to claim 1, wherein the sample-and-hold unit is arranged on the second substrate.

3. The photoelectric conversion device according to claim 2, wherein a signal outputted from the first sample-and-hold circuit and the second sample-and-hold circuit is transferred to the conversion unit via the same via connecting the second substrate on which the sample-and-hold unit is arranged and the third substrate on which the sample-and-hold unit is not arranged and the conversion unit is arranged.

4. The photoelectric conversion device according to claim 2, wherein a portion of the conversion unit is arranged on the second substrate on which the sample-and-hold unit is arranged.

5. The photoelectric conversion device according to claim 4, wherein in the conversion unit, the analog-to-digital conversion circuit is connected to the one vertical signal line, and
    wherein a portion of the analog-to-digital conversion circuit is arranged on the second substrate on which the sample-and-hold unit is arranged.

6. The photoelectric conversion device according to claim 1, wherein the sample-and-hold unit is arranged on the second substrate, and
    wherein the conversion unit is arranged on the third substrate.

7. The photoelectric conversion device according to claim 1, wherein the conversion unit is arranged on the third substrate.

8. The photoelectric conversion device according to claim 7, wherein a portion of the sample-and-hold unit is arranged on the third substrate on which the conversion unit is arranged.

9. The photoelectric conversion device according to claim 8, wherein either the first sample-and-hold circuit or the second sample-and-hold circuit is arranged on the second substrate and the other is arranged on the third substrate.

10. The photoelectric conversion device according to claim 1, wherein a plurality of vertical signal lines are arranged for one pixel column of the pixel portion.

11. The photoelectric conversion device according to claim 1, wherein the plurality of pixels configure a plurality of pixel units, each including one or more pixels, and
    wherein the vertical signal line is arranged corresponding to each of the plurality of pixel units.

12. The photoelectric conversion device according to claim 1, wherein the conversion unit includes a ΔΣ analog-to-digital conversion circuit.

13. The photoelectric conversion device according to claim 1, wherein the conversion unit includes a slope analog-to-digital conversion circuit.

14. The photoelectric conversion device according to claim 1, wherein substrates on which the group is arranged are arranged in a stack.

15. The photoelectric conversion device according to claim 1, wherein the second substrate is stacked between the first substrate and the third substrate.

16. The photoelectric conversion device according to claim 1, wherein the conversion unit is a ΔΣ analog-to-digital conversion unit.

17. An electronic device comprising:
    the photoelectric conversion device according to claim 1; and
    a control device configured to control an operation of the photoelectric conversion device.

18. A substrate comprising:
    an input unit;
    an output unit; and
    a sample-and-hold unit,
    wherein the substrate is to be stacked with a plurality of substrates,
    wherein an analog signal is inputted to the input unit from a substrate of the plurality of substrates,
    wherein the sample-and-hold unit is provided with a configuration that holds the analog signal inputted to the input unit via a vertical signal line,
    wherein the output unit outputs, to another substrate of the plurality of substrates, an analog signal that the sample-and-hold unit held,
    wherein in the sample-and-hold unit, a first sample-and-hold circuit and a second sample-and-hold circuit are connected to one vertical signal line,
    wherein in the sample-and-hold unit, a third sample-and-hold circuit is connected to a vertical signal line different from the one vertical signal line, and
    wherein a distance between a capacitive element included in the first sample-and-hold circuit and a capacitive element included in the second sample-and-hold circuit is shorter than a distance between the capacitive element included in the first sample-and-hold circuit and a capacitive element included in the third sample-and-hold circuit.

19. The substrate according to claim 18, wherein the input unit and the output unit are different from each other in a configuration that connects the substrates to each other.

* * * * *